Aug. 28, 1928.
J. REID ET AL
1,682,248
VALVE COCK
Filed Nov. 3, 1925
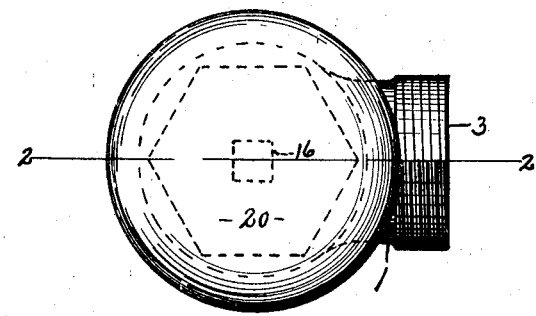
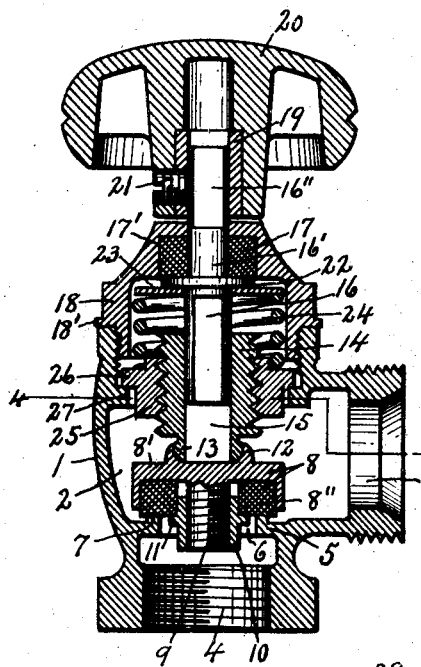
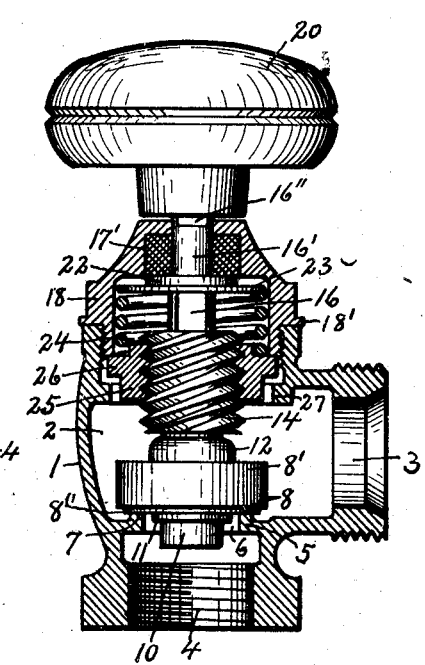
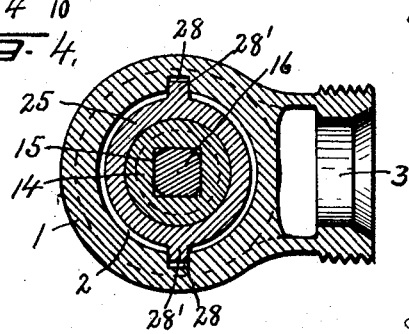
INVENTOR
James Reid
G. R. Welsh
BY Denison & Thompson
ATTORNEYS
WITNESS
H. Hurst Patented Aug. 28, 1928.

1,682,248

UNITED STATES PATENT OFFICE.

JAMES REID AND GEORGE R. WELCH, OF SYRACUSE, NEW YORK, ASSIGNORS TO PIERCE, BUTLER & PIERCE MANUFACTURING CORPORATION, OF SYRACUSE, NEW YORK, A CORPORATION OF NEW YORK.

VALVE COCK.

Application filed November 3, 1925. Serial No. 66,548.

This invention relates to valves of the screw compression type commonly used in steam and hot water or vapor distributing systems but is equally useful as a water faucet and in any other relations where it is desired to control the flow of fluid whether in a liquid or gaseous form.

The screws for operating these valves are usually of steep pitch for expediting the opening and closing of the valve and in the ordinary valve of this type the unequal expansion and contraction of the movable and fixed parts together with the steep pitch of the thread causes more or less opening of the valve, particularly under varying temperatures even though it may be firmly closed by hand at any temperature.

The main object of the present invention is to provide simple and efficient means for compensating for this inequality of expansion and contraction by the provision of resilient means such as a coiled spring for yieldingly holding the valve disk to its seat under the varying relations between the movable and fixed parts due to such unequal expansion and contraction.

In other words, we have sought to prevent the "unwinding" of the valve operating screw under the conditions mentioned.

Other objects and uses relating to specific parts of the valve structure will be brought out in the following description.

In the drawings:—

Figure 1 is a face view of a globe-cock embodying the various features of my invention.

Figure 2 is a longitudinal sectional view of the same device taken on line 2—2, Figure 1, in which the valve is shown as closed but not under spring pressure.

Figure 3 is a longitudinal sectional view of the valve case showing the valve and screw and also the stem and handle in elevation and the valve under pressure of the spring.

Figure 4 is a transverse sectional view taken in the plane of line 4—4, Figure 2.

As illustrated, this valve mechanism comprises a case —1— having a valve chamber —2— provided with passages —3— and —4— for the passage of fluid through the valve chamber, said case being provided with the usual partition —5— having a port —6— connecting the passages —3— and —4—. The partition —5— is provided with a valve seat —7— adapted to be engaged by a movable valve member —8— consisting in this instance of a metal disk —8'— and a fibre or equivalent packing ring —8"—.

The disk —8'— is provided with a threaded stem —9— engaged by a nut —10— which in turn is provided with an annular flange —11— for clamping the fibre section —8"— in the adjacent recessed end of the disk —8'—.

The inner end of the disk —8'— is provided with an annular shoulder —12— which is crimped over and upon the adjacent beaded end —13— of a right hand screw sleeve —14— for swivel connection with the screw.

The screw —14— is threaded externally and is provided with a central lengthwise opening —15— of angular or square cross section for receiving an operating stem or shaft —16— of similar cross section.

The stem —16— is extended through a packing —17— in the outer end of a cap section —18— which is screwed in a threaded opening in the adjacent end of the case section —1— and which is provided with an annular flange —18'— abutting against the adjacent end of the case section —1— when the cap section is tightly screwed in place thereby forming a part of the valve case.

The intermediate portion as —16'— of the stem —16— passing through the packing —17— is preferably cylindrical while the outer end extends some distance beyond the corresponding end of the cap —18— and is preferably angular or square in cross section at —16"— for receiving a metal sleeve —19— of similar internal cross section, said sleeve being tightly seated in the inner end of a suitable handle —20— to form a part thereof.

The hub of the handle including the sleeve —19— is provided with a radial threaded opening for receiving a set screw —21— by which the handle —20— is firmly secured to the outer end —16"— of the stem —16—.

The portion of the stem —16— passing through and beyond the packing —17— is of slightly less diameter than the inner end of the stem to form a shoulder against which is fixed an annular collar —22— forming a unitary part of the stem and abutting against the inner face of the packing in the recess in the cap to hold the packing in place.

A washer —23— is loosely mounted upon the stem —16— and against the inner face of the collar —22— to form a seat for one end of a coiled spring —24— which is located in a recess or socket in the inner end of the cap section —18—.

A nut —25— is engaged with the external threads of the screw —14— and is provided with an annular flange —26— normally resting upon an internal annular shoulder —27— on the case —1—.

The thickness of the flange —26— on the nut —25— is somewhat less than the distance between the annular shoulder —27— and the inner end of the cap section —18— to allow a limited endwise movement of the nut relatively to the case —1—.

The inner end of the coiled spring —24— is engaged with the outer end of the nut —25— and, as previously stated, has its outer end engaged with the washer —23— so that when the screw —14— is rotated in the nut to close the valve —8— against its seat —7— the continued rotation of the valve screw after the valve has engaged its seat will draw the nut —25— outwardly against the action of the spring —24— until limited by the inner end of the cap —18— thereby holding the valve under yielding pressure against its seat.

Suitable means is provided for holding the nut —25— against rotation consisting in this instance of grooves or guide ways —28— in diametrically opposite walls of the valve case —1— and ribs —28'— on diametrically opposite sides of the nut slidable in the grooves —28— as shown in Figure 4.

*Operation.*

The external threads of the screw sleeve —14— are of relatively steep pitch for effecting a quick opening and closing of the valve which when closed is held against rotation by frictional engagement with its valve seat as the screw continues to rotate for compressing the spring —24— thereby reducing the wear upon the face of the valve and valve seat.

When the parts are assembled for operation as shown in the drawings, the stem —16— carrying the handle —20— will be held against endwise movement by the interposition of the collar —22— between the washer —23— and adjacent end of the cap —18—.

Now as the handle —20— is rotated in a clockwise direction the screw sleeve —14— will be rotated in a similar direction in the nut —25— thereby forcing the sleeve —14— and valve —8— inwardly until the valve —8— engages its seat —7—.

Then by the continued rotation of the handle —20— and screw —14— in the same direction the nut —25— will be drawn outwardly by the screw against the action of the spring —24— until limited by the inner end of the cap which stops the rotation of the screw in a clockwise direction and places the closed valve under the pressure of the spring —24— and screw —14—.

The rotation of the handle —20— and screw —14— in a counter-clockwise direction when the valve is closed will first allow the nut —25—to be forced inwardly until stopped by the engagement of its flange —26— with the shoulder —27— after which the continued rotation of the screw in a counter clockwise direction will quickly open the valve to the extent desired, it being understood that the nut —25— and valve —8— are spaced a sufficient distance apart to permit full opening of the valve.

What we claim is:

1. In a valve of the character described, a case having a valve seat and axially spaced shoulders, a nut having a limited axial movement in the case between said shoulders and toward and from the valve seat and spring-pressed toward said seat, a valve movable into and out of engagement with said seat, and a screw engaged with the nut for closing the valve and for moving the nut against the action of its spring for yieldingly holding the valve in its closed position, and means for rotating the screw, said screw having an independent axial movement relatively to its rotating means.

2. In a valve of the character described, a valve case having a valve seat, a valve movable into and out of engagement with the seat, a nut having a limited axial movement, means for holding the nut against rotation, a spring for pressing the nut toward the valve seat, a screw engaging the nut and valve for closing and opening the valve and for moving the nut axially against the action of its spring after the valve is closed, and means for rotating the screw, said screw being movable axially relatively to its rotating means.

3. Valve operating means including a screw and a nut engaged therewith and each movable axially relatively to the other by a relative rotation of the screw, means for holding the nut against rotation, a valve swivel connected to the screw, a spring for exerting pressure upon the nut in the direction of closing movement of the valve, and means for rotating the screw, said screw being movable relatively to its rotating means.

4. Valve-operating means comprising a screw, a valve mounted on the screw, means for rotating the screw, said screw being movable axially relatively to its rotating means, a nut engaged with the screw and having a limited endwise movement, means for limiting the endwise movement of the nut and a coiled spring for exerting pressure upon the nut in the direction of closing movement of the valve and means for holding the nut against rotation.

5. Valve-operating mechanism comprising in combination with a valve, a screw rotatably engaged with the valve and provided with a central lengthwise opening of angular cross section, a stem of similar cross section entering said opening, means for rotating the stem and thereby rotating the screw, said screw being movable axially relatively thereto, a nut engaged with the screw and having a limited endwise movement, means for limiting the endwise movement of the nut, means for holding the nut against rotation, and a spring for exerting pressure upon the nut in the direction of closing movement of the valve.

6. The combination with a valve case having a recess with a packing therein and a valve seat co-axial therewith and in spaced relation thereto, a stem rotatable in the packing and provided with external means for rotating it, means for holding the stem against outward axial movement, a screw splined on the stem, a valve loosely mounted on the screw to permit relative rotation of the screw and valve, a nut engaging the screw and having a limited endwise movement relatively to the screw and valve case, means for limiting the endwise movement of the nut, means for holding the nut against rotation, and a spring exerting presure upon the nut in the direction of closing movement of the valve.

7. In a valve-operating mechanism, the combination with a valve case having a packing and a valve seat, of a stem rotatable in the packing and provided with external means for rotating it, means for holding the stem against axial movement, a screw splined on the stem to be rotated thereby and movable axially relatively thereto, a valve loosely mounted on the screw to permit relative rotation of the screw and valve, a nut engaging the screw and having a limited axial movement relative to the screw and to the valve case, means for limiting the axial movement of the nut, means preventing rotary movement of the nut, means preventing disengagement of the screw and nut, and a spring exerting pressure upon the nut in the direction of the closing movement of the valve.

In witness whereof we have hereunto set our hands this 29th day of October, 1925.

JAMES REID.
GEORGE R. WELCH.